(12) United States Patent
Lal

(10) Patent No.: US 7,519,975 B2
(45) Date of Patent: *Apr. 14, 2009

(54) METHOD AND APPARATUS FOR EXCEPTION HANDLING IN A MULTI-PROCESSING ENVIRONMENT

(75) Inventor: Sanjay Lal, Cupertino, CA (US)

(73) Assignee: Redback Networks, Inc., San Jose, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 11/492,335

(22) Filed: Jul. 24, 2006

(65) Prior Publication Data

US 2006/0265717 A1 Nov. 23, 2006

Related U.S. Application Data

(63) Continuation of application No. 09/873,038, filed on Jun. 2, 2001, now Pat. No. 7,082,610.

(51) Int. Cl.
*G06F 15/16* (2006.01)
*G06F 15/173* (2006.01)
*G06F 15/177* (2006.01)

(52) U.S. Cl. .................. 719/318; 714/10; 712/10

(58) Field of Classification Search ........... 719/318, 719/310–312; 714/10–13; 712/10–22, 28–31, 712/244; 709/217–228
See application file for complete search history.

(56) References Cited

U.S. PATENT DOCUMENTS

| | | | |
|---|---|---|---|
| 5,283,900 A | 2/1994 | Frankel et al. | |
| 5,784,649 A | 7/1998 | Begur et al. | |
| 5,909,224 A | 6/1999 | Fung | |
| 5,909,574 A | 6/1999 | Meyer | |
| 5,946,095 A | 8/1999 | Henningsen et al. | |
| 6,006,247 A | 12/1999 | Browning et al. | |
| 6,072,618 A | 6/2000 | Takenaka | |

(Continued)

FOREIGN PATENT DOCUMENTS

WO PCT/US02/15709 5/2002

(Continued)

OTHER PUBLICATIONS

Earnshaw, R.W., et al., "Challenges in Corss-Development," IEEE Micro, pp. 28-36, Jul./Aug. 1997.

(Continued)

*Primary Examiner*—Haresh N Patel
(74) *Attorney, Agent, or Firm*—Blakely, Sokoloff, Taylor & Zafman LLP

(57) ABSTRACT

A method and apparatus for exception handling in a multi-processor environment are described. In an embodiment, a method for handling a number of exceptions within a processor in a multi-processing system includes receiving an exception within the processor, wherein each processor in the multi-processor system shares a same memory. The method also includes executing a number of instructions at an address within a common interrupt handling vector address space of the same memory. The number of instructions cause the processor to determine an identification of the processor based on a query that is internal to the processor. Additionally, the method includes modifying execution flow of the exception to execute an interrupt handler located within one of a number of different interrupt handling vector address spaces.

13 Claims, 5 Drawing Sheets

U.S. PATENT DOCUMENTS

| | | |
|---|---|---|
| 6,085,307 A | 7/2000 | Evoy et al. |
| 6,167,479 A | 12/2000 | Hartnett et al. |
| 6,205,560 B1 | 3/2001 | Hervin et al. |
| 6,263,415 B1 | 7/2001 | Venkitakrishnan |
| 6,425,039 B2 | 7/2002 | Yoshioka et al. |
| 6,611,911 B1 | 8/2003 | O'Shea et al. |
| 6,625,679 B1 | 9/2003 | Morrison et al. |
| 6,651,163 B1 | 11/2003 | Kranich et al. |
| 6,745,336 B1 | 6/2004 | Martonosi et al. |
| 6,856,616 B1 | 2/2005 | Schuster et al. |
| 6,880,086 B2 | 4/2005 | Kidder et al. |
| 2002/0073131 A1 | 6/2002 | Brenner, Jr. et al. |

FOREIGN PATENT DOCUMENTS

| | | |
|---|---|---|
| WO | PCT/US02/15709 | 7/2002 |

OTHER PUBLICATIONS

Santhanam, S., et al., "A Low-Cost, 300-MHz, RISC CPU with Attached Media Processor," IEEE Journal of Solid-State Circuits, vol. 33, No. 11, pp. 1829-1839, Nov. 1998.

INTERNAL REGISTER 402

INTERNAL REGISTER 402

METHOD AND APPARATUS FOR EXCEPTION HANDLING IN A MULTI-PROCESSING ENVIRONMENT

CROSS-REFERENCE TO RELATED APPLICATIONS

This is a continuation of Ser. No. 09/873,038 now U.S. Pat. No. 7,082,610, entitled "A Method and Apparatus for Exception Handling in a Multi-Processing Environment" filed on Jun. 2, 2001.

FIELD OF THE INVENTION

The invention relates to the field of multi-processing. More specifically, the invention relates to a method and apparatus for exception handling in a multi-processing environment.

BACKGROUND OF THE INVENTION

As demand for processing power across different environments continues to increase, the need for multiple processors executing in a multi-processing environment has grown. Additionally, in different environments, the amount of memory could be limited due to cost and/or space restraints. Therefore, in certain multi-processor environments, such as a symmetric multi-processing environment, memory is shared among the different processors and thereby segregated to allow use of different portions of the memory by each of the different processors. However, for symmetric multi-processing, the same operating system is employed for running on both processors.

However, for certain applications, the different processors in a multi-processing environment are running different operating systems. For example, in a communications networking environment, given control cards within network elements may require a number of processors such that each processor is running a different operating system in order to accommodate the various functionality required for these control cards. To help illustrate, one processor could include a real time operating system in order to handle routing of data received within the network element, while a second processor could include a non-real time operating system in order to handle provisioning and configuration of the network element.

Disadvantageously, problems arise in a multi-processing environment wherein multiple processors are designed to share a same memory while executing different operating systems. Examples of such problems are encountered in the handling of exceptions, such as interrupts, by the different operating systems. In particular, the architecture of processors is typically such that they reserve an address space within memory to act as the exception handling vector addresses for handling, at least initially, the exceptions received by the processor. However, different operating systems generally handle their exceptions differently. Therefore, when two processors of a same type are executing different operating systems, there is a conflict in the handling of exceptions as both processors are designed to use the same address space in memory for initial exception handling.

Therefore, in typical multi-processing systems wherein this conflict of exception handling address space arises, a processor queries the memory controller to determine which processor it is (and therefore which operating system it is running) and processes the exception based on this knowledge. Disadvantageously, each time an exception is received, the processor must perform this query of the memory controller, which slows down the processing of these exceptions as this is a query that is external to the processor that can require multiple clock cycles to process.

SUMMARY OF THE INVENTION

A method and apparatus for exception handling in a multi-processor environment are described. In an embodiment, a method for handling a number of exceptions within a processor in a multi-processing system includes receiving an exception within the processor, wherein each processor in the multi-processor system shares a same memory. The method also includes executing a number of instructions at an address within a common interrupt handling vector address space of the same memory. The number of instructions cause the processor to determine an identification of the processor based on a query that is internal to the processor. Additionally, the method includes modifying execution flow of the exception to execute an interrupt handler located within one of a number of different interrupt handling vector address spaces.

Additionally, a system comprises a memory that includes a common exception handling vector address space and a number of exception handling vector address spaces. The system also includes a memory controller coupled to the memory. Moreover, the system includes a first processor coupled to the memory controller. The first processor is to execute a first operating system. The system also includes a second processor coupled to the memory controller. The second processor is to include an internal register. Additionally, the second processor is to execute a second operating system and is to execute a number of instructions in the common exception handling vector address space upon receipt of an exception. The number of instructions cause the second processor to determine an identification of the second processor based on a value stored in the internal register. Additionally, the first processor and the second processor share the memory.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given element in a Figure is associated with the number of the Figure. For example, processor 102 can be located in FIG. 1. However, element numbers are the same for those elements that are the same across different Figures.

In the drawings.

DETAILED DESCRIPTION

A method and apparatus for exception handling in a multi-processor environment are described. In the following description, for purposes of explanation, numerous specific details are set forth in order to provide a thorough understanding of the present invention. It will be evident, however, to one skilled in the art that the present invention may be practiced without these specific details.

Figure 1:
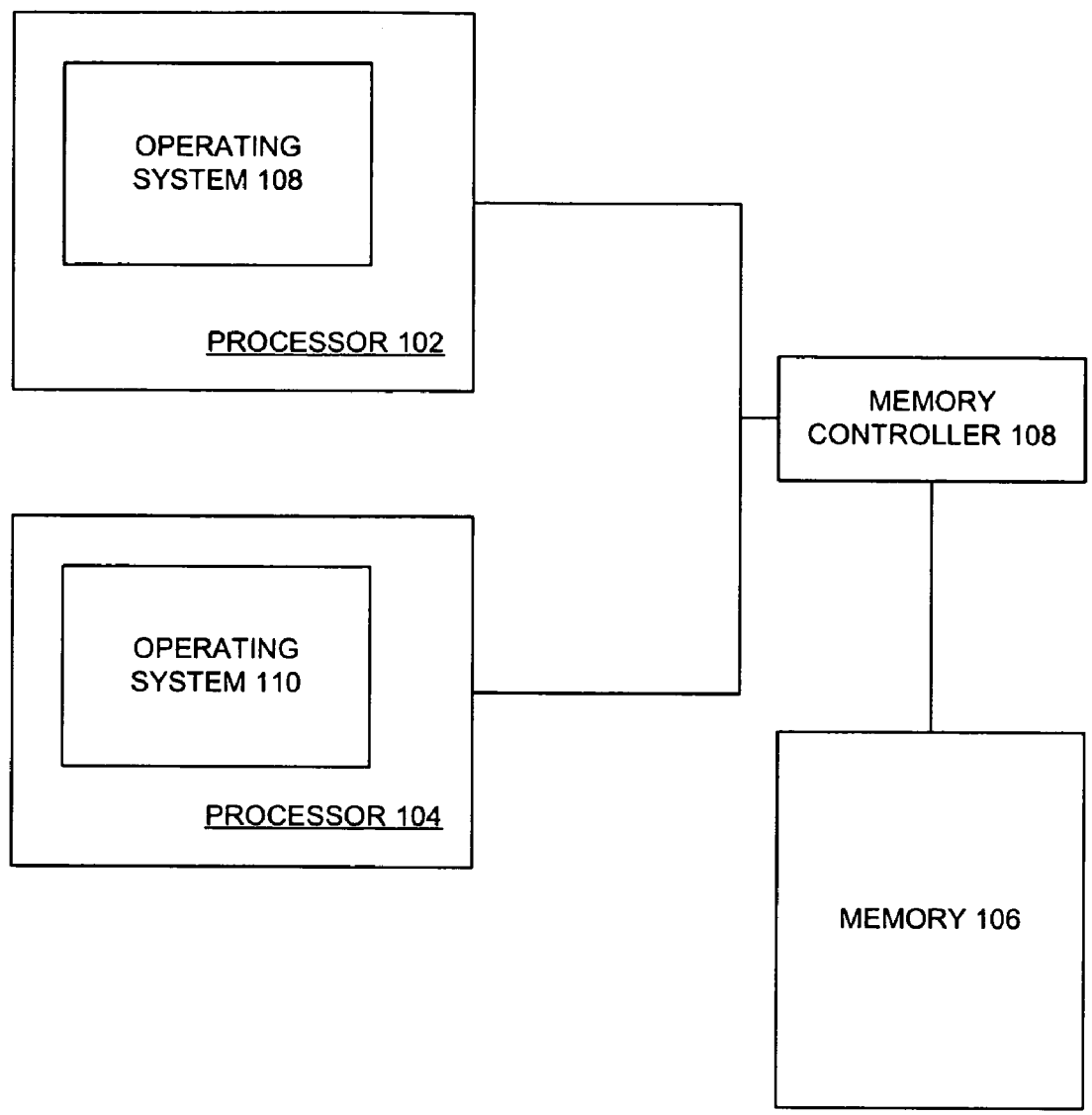
FIG. 1 is block diagram illustrating a system that incorporates embodiments of the present invention.

FIG. 1 is block diagram illustrating a system that incorporates embodiments of the present invention. In particular, FIG. 1 includes processor 102 and processor 104 that are coupled to memory controller 108. In an embodiment, processor 102 and/or processor 104 can be MPC750 PowerPC™ processors from Motorola®. Memory controller 108 is also coupled to memory 106, which, in an embodiment, can be random access memory. Additionally, processor 102 is executing operating system 108, while processor 104 is executing operating system 110. Operating system 108 and operating system 110 are shown as being within processor 102 and processor 104. However, embodiments of the present invention are not limited to having these operating systems residing only within such processors, as these operating systems can reside in other units, such as memory 106. Rather, FIG. 1 helps illustrate the association of the operating systems to the different processors. Moreover, the system of FIG. 1 is by way of example and not by way of limitation as a greater number of processors and/or operating systems can be incorporated into embodiments of the present invention.

Figure 2:
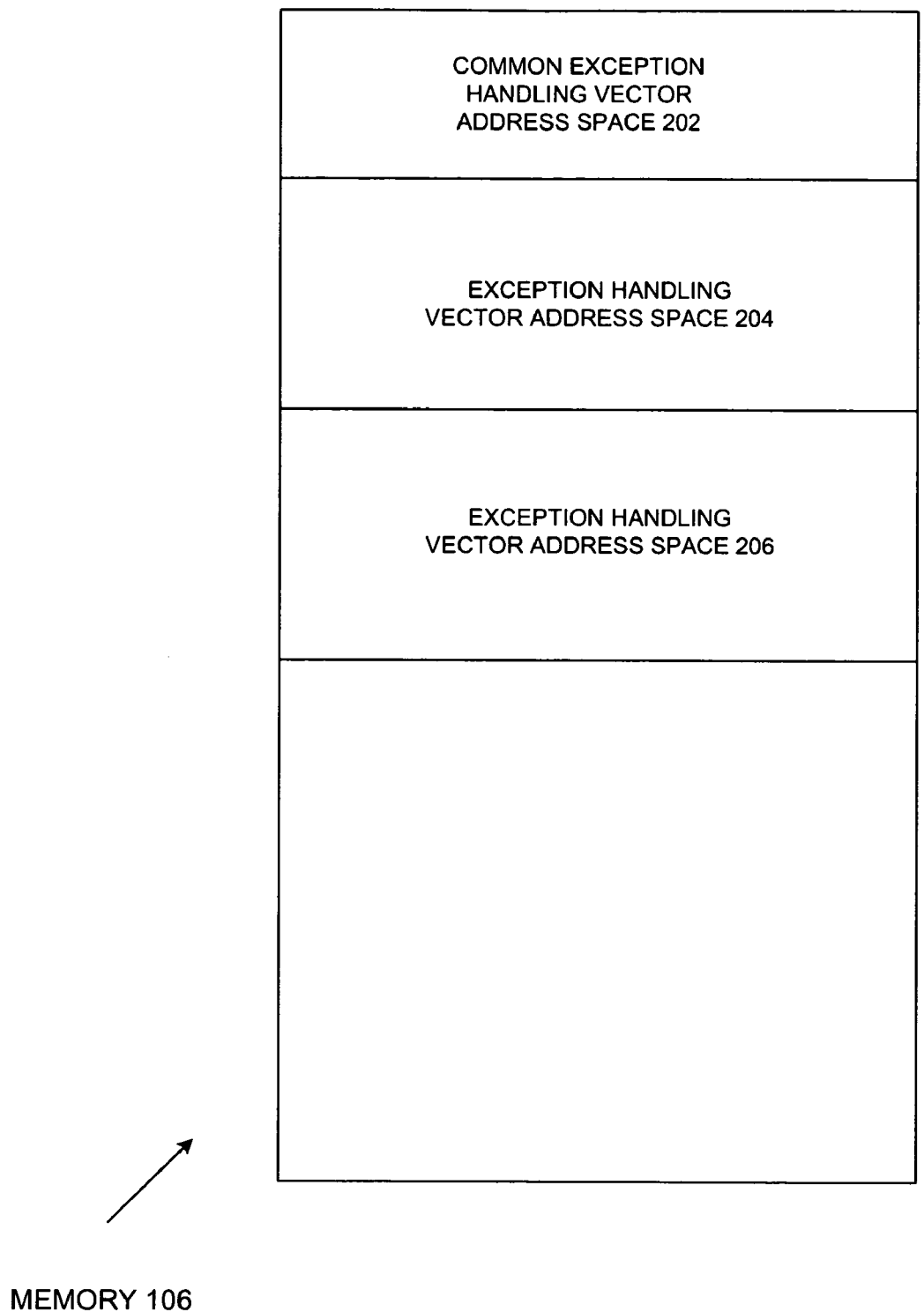
FIG. 2 illustrates a more detailed diagram of memory 106, according to embodiments of the present invention.

FIG. 2 illustrates a more detailed diagram of memory 106, according to embodiments of the present invention. As illustrated, memory 106 includes common exception handling vector address space 202. As will be described in more detail below, common exception handling vector address space 202 handles exceptions from both operating system 108 of processor 102 and operating system 110 of processor 104. In one embodiment, common exception handling vector address space 202 includes addresses from 0x0-0x3000. Memory 106 also includes exception handling vector address space 204. As will be described in more detail below, exception handling vector address space 204 provides additional handling of exceptions from operating system 108 of processor 102. In an embodiment, exception handling vector address space 204 includes address from 0x3001-0x6000. Memory 106 also includes exception handling vector address space 206. As will be described in more detail below, exception handling vector address space 206 provides additional handling of exceptions from operating system 110 of processor 104. In an embodiment, exception handling vector address space 206 includes address from 0x6001-0x9000.

Figure 3:
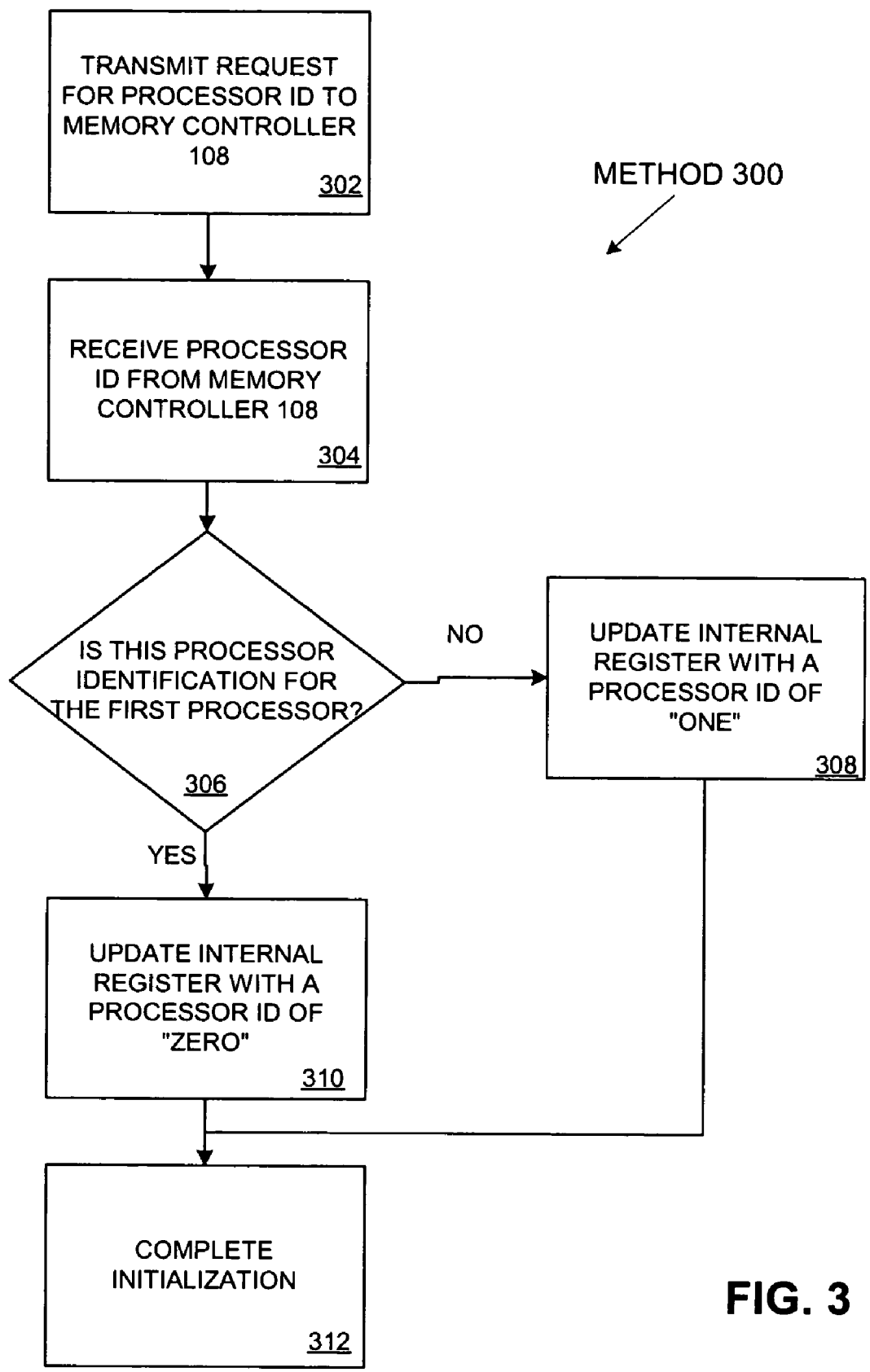
FIG. 3 illustrates a flow diagram of a portion of the initialization process for a processor in a multi-processing environment, according to embodiments of the present invention.

The operation of the system of FIG. 1 will now described in conjunction with the flow diagrams illustrated in FIGS. 3 and 4. In particular, FIG. 3 illustrates a flow diagram of a portion of the initialization process for a processor in a multi-processing environment, according to embodiments of the present invention. Method 300 of FIG. 3 will be described in reference to processor 102 of FIG. 1. However, embodiments of the present invention are not so limited, as the process described by method 300 is applicable to processor 104 and other processors (not shown) within a multi-processing environment.

Method 300 of FIG. 3 commences with the transmitting of a request for processor identification by processor 102 to memory controller 108, at process block 302. In particular, memory controller 108 tracks a unique identification for each processor in the multi-processing system. For example, in an embodiment, memory controller 108 could have different pins associated with different processors. Accordingly, when a given signal is received on one of these pins, memory controller 108 knows the identification of the processor transmitting this signal.

To help illustrate, signals received on pin 35 of memory controller 108 could be associated with processor 0, while signals received on pin 36 of memory controller 108 could be associated with processor 1. Therefore, when a request for processor identification is received on pin 35, memory controller 108 returns a processor identification of zero. Conversely, when a request for processor identification is received on pin 36, memory controller 108 returns a processor identification of one. Therefore, assuming the processor 102 is coupled to pin 35 (in this example) and transmits this request for processor identification, memory controller 108 would return zero as its processor identification.

Processor 102 receives its processor identification from memory controller 108, at process block 304. Processor 102 determines if this processor identification is the first processor (i.e., processor identification of zero), at process decision block 306. Upon determining that the processor identification is not the first processor (i.e., does not have a processor identification of zero), processor 102 updates an internal register to identify processor 102 with a processor identification of one, at process block 308.

Figure 4A:
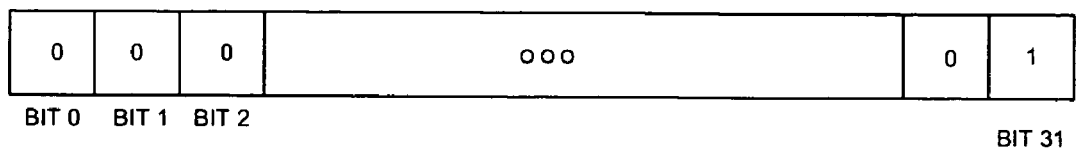
FIGS. 4A-4B illustrate a register internal to a processor for storing the processor identification, according to embodiments of the present invention.
Figure 4B:
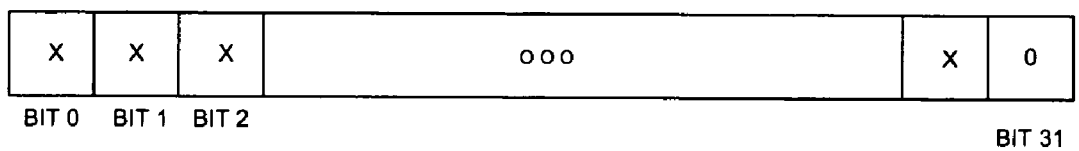

FIGS. 4A-4B illustrate a register internal to a processor for storing the processor identification, according to embodiments of the present invention. In particular, FIG. 4A illustrates the state of internal register 402 when the processor identification is one, while FIG. 4B illustrates the state of internal register 402 when the processor identification is zero, according to one embodiment of the present invention. In one such embodiment wherein processor 102 is a MPC750 PowerPC™ processor from Motorola®, internal register 402 employed for the storage of the processor identification is an internal register that allows for instruction cache throttling, which provides for the reduction of the instruction execution rate based on the value stored in the register.

As shown in FIG. 4A, internal register 402 is a 32-bit register with bits 0-31. In an embodiment wherein processor 102 is a MPC750 PowerPC™ processor from Motorola® and internal register 402 can be used for instruction cache throttling, bit 31 is the enabled bit for this functionality, while bits 0-30 include values to indicate the amount of throttling. However, for embodiments of the present invention, bit 31 is employed as the processor identification bit. Therefore, returning to process block 308 of FIG. 3, processor 102 sets this bit to a value of one, as shown in FIG. 4A upon determining that it is the second processor in the two processor system. Moreover, in an embodiment wherein processor 102 is a MPC750 PowerPC™ processor from Motorola® and internal register 402 can be used for instruction cache throttling, processor 102 sets the value of bits 0-30 to zero. Accordingly, even though the enabled bit is set for this instruction cache throttling register, processor 102 will not perform any adjustment of the instruction execution rate, as the values indicating the amount of throttling within internal register 402 are set to zero. Additionally, processor 102 completes initialization, at process block 312.

Upon determining that the processor identification is the first processor (i.e., does not have a processor identification of zero), processor 102 updates an internal register to identify processor 102 with a processor identification of zero, at process block 310. FIG. 4B illustrates the state of internal register 402 when the processor identification is zero, according to one embodiment of the present invention. In one such embodiment wherein processor 102 is a MPC750 PowerPC™ processor from Motorola®, internal register 402 employed for the storage of the processor identification is an internal register that allows for instruction cache throttling, which provides for the reduction of the instruction execution rate based on the value stored in the register.

Therefore, returning to process block 310 of FIG. 3, processor 102 sets this bit 31 to a value of zero, as shown in FIG. 4B upon determining that it is the first processor in the two processor system. Moreover, in an embodiment wherein processor 102 is a MPC750 PowerPC™ processor from Motorola® and internal register 402 can be used for instruction cache throttling, the value of bits 0-30 are considered "don't cares" (illustrated by a value of 'X'), as the enabled bit (bit 31) is set to zero, thereby making the register not enabled for adjusting or throttling the instruction execution rate. Additionally, processor 102 completes initialization, at process block 312.

Method 300 was described in terms of an internal register that is not dedicated to the storage on the processor identification, but rather can be employed for other functionality. However, embodiments of the present invention are not so limited. For example, in another embodiment, a designated register specifically for storing the processor identification could be used within the processors. To further illustrate, in another embodiment, one to a number of reserved bits (not necessarily associated or stored in a register) for storing the processor identification could be used within the processors. In one embodiment, a general-purpose register would be reserved for storing the processor identification within the processors.

Further, method 300 illustrated in FIG. 3 was illustrated based on two processors, such that one processor had a processor identification of zero and the second processor had a processor identification of one. However, this is by way of example and not by way of limitation, as more processors with different processor identifications could be incorporated into embodiments of the present invention.

Figure 5:
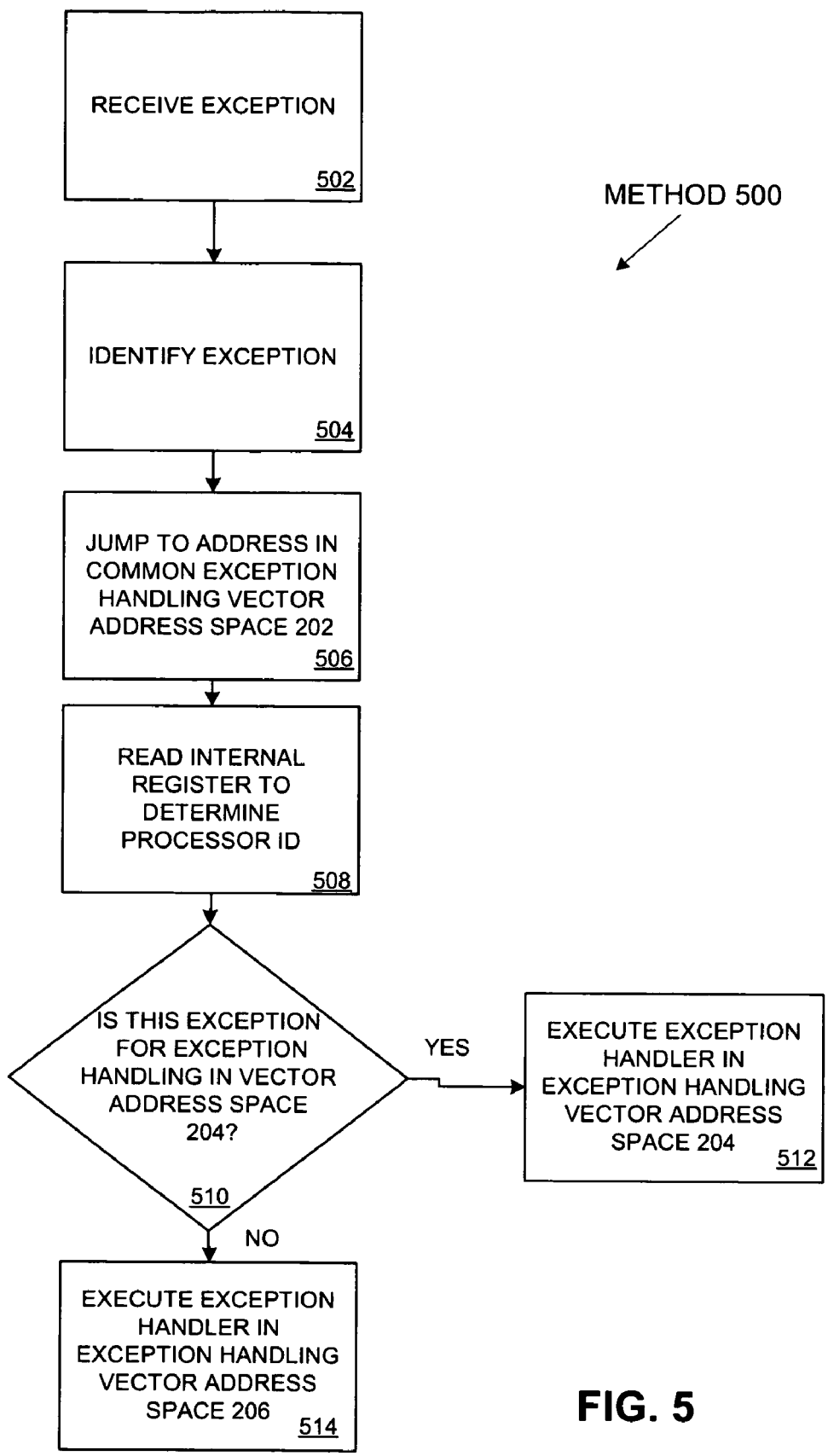
FIG. 5 illustrates a flow diagram of exception handling in a multi-processing system, according to embodiments of the present invention.

FIG. 5 illustrates a flow diagram of exception handling in a multi-processing system, according to embodiments of the present invention. Method 500 of FIG. 5 will be described in reference to processor 102 of FIG. 1. However, embodiments of the present invention are not so limited, as the process described by method 500 is applicable to processor 104 and other processors (not shown) within a multi-processing environment.

Method 500 commences with the receipt of an exception by processor 102, at process block 502. In one embodiment, this exception can be an interrupt. In an embodiment, this exception is an internal interrupt, such as a floating-point exception when the floating-point unit is within processor 102. In another embodiment, this exception is an external interrupt, such as one received from an externally coupled unit (such as a hard disk drive). Additionally, processor 102 identifies the exception, at process block 504. For example, processor 102 identifies the origination of the exception, such as the device, as well as an exception number or value.

Based on the identification of the exception, processor 102 jumps to the associated address in common exception handling vector address space 202 (shown in FIG. 2) within memory 106. In particular, different addresses within common exception handling vector address space 202 are associated with different exceptions. For example, a floating-point exception could be associated with address 0x500 within common exception handling vector address space 202.

In one embodiment, the architecture of processor 102 is such that the number of bytes for a given exception within common exception handling vector address space 202 is limited. For example, in an embodiment, the number of bytes for exception handling is 256 within common exception handling vector address space 202, thereby limiting the number of instructions for processing the exceptions. Accordingly, for some exceptions, these limited number of bytes are employed to set up processor 102 (such as its internal registers) to handle the exception and then cause processor 102 to jump to a different address for completion of the exception handling (which is described in more detail below).

Additionally, processor 102 reads an internal register (which is describe above in conjunction with FIGS. 3 and 4) to determine its processor identification, at process block 508. In one such embodiment, processor 102 reads this internal register based on an instruction within the address for this exception within common exception handling vector address space 202. Returning to the example in FIG. 4 above, if bit 31 is set to zero, processor 102 has a processor identification of zero, and if bit 31 is set to one, processor 102 has a processor identification of one.

Processor 102 determines which of the exception handling vector address spaces to jump based on the processor identification. In particular, processor 102 determines whether this exception is for exception handling vector address space 204, at process decision block 510. Upon determining that this exception is for exception handling vector address space 204, processor 102 jumps to the associated address within exception handling vector address space 204, at process block 512. In contrast, upon determining that this exception is for exception handling vector address space 206, processor 102 jumps to the associated address within exception handling vector address space 206, at process block 514.

In particular, exception handling vector address space 204 and exception handling vector address space 206 are associated with operating system 108 and operating system 110, respectively. Therefore, because operating system 108 executing within processor 102 is different from operating system 110 executing within processor 104, a different set of exception handlers can be needed for the different operating systems, as different operating system can handle the same exception differently.

Therefore, in an embodiment, if the exception is originating from operating system 108 within processor 102, instructions within common exception handling vector address space 202 cause processor 102 to change the execution flow to process instructions at the exception handling address for this exception within exception handling vector address space 204. Similarly, in an embodiment, if the exception is originating from operating system 110 within processor 104, instructions within common exception handling vector address space 202 cause processor 104 to change the execution flow to process the instructions at the exception handling address for this exception within exception handling vector address space 206.

To help illustrate, assume that instructions within addresses 0x500 to 0x600 within common exception handling address vector address space 202 handle floating-point exceptions for processor 102 and processor 104 (which are of a same type). Additionally, assume that instructions within addresses 0x3500 to 0x3600 within exception handling address vector address space 204 handle floating-point exceptions for operating system 108 within processor 102, while instructions within addresses 0x6500 to 0x6600 within exception handling address vector address space 206 handle floating-point exceptions for operating system 110 within processor 104. Therefore, upon receipt of a floating-point exception, both processor 102 and processor 104 execute the instructions within addresses 0x500 to 0x600 within common exception handling address vector address space 202. Additionally, upon determining the processor identification, instructions within addresses 0x500 to 0x600 change execution flow to execute the instructions within addresses 0x3500 to 0x3600 within exception handling address vector address space 204, if the exception was received by operating system 108 executing on processor 102. Similarly, upon determining the processor identification, instructions within addresses 0x500 to 0x600 change execution flow to execute the instructions within addresses 0x3500 to 0x3600 within exception handling address vector address space 204, if the exception was received by operating system 108 executing on processor 102.

Additionally, in an embodiment, the exception handlers within exception handling vector address spaces 204 and 206 are limited in the number of bytes (and therefore the number of instructions). Accordingly, these exception handlers within exception handling vector address spaces 204 and 206 can cause a change in execution flow to complete the exception at addresses beyond exception handling vector address space 206. Moreover, embodiments of the present invention describe the change in execution flow to different exception handling vector address spaces. In one embodiment, this change in execution flow can be through a software interrupt. In another embodiment, this change in execution flow can be through a function call. These embodiments of the change in execution flow are by way of example and not by way of limitation, as other techniques can be employed. For example, this change in execution flow could be through a direct jump provided in software.

Embodiments of the present invention include memories and processors. Such memories and processors include machine-readable medium on which is stored a set of instructions (i.e., software) embodying any one, or all, of the methodologies described herein. Software can reside, completely or at least partially, within this memory and/or within the processor. For the purposes of this specification, the term "machine-readable medium" shall be taken to include any mechanism that provides (i.e., stores and/or transmits) information in a form readable by a machine (e.g., a computer). For example, a machine-readable medium includes machine storage media (read only memory ("ROM"), random access memory ("RAM"), magnetic disk storage media; optical storage media, flash memory devices) and machine transmission media, (electrical, optical, acoustical, or other form of propagated signals (e.g., carrier waves, infrared signals, digital signals, etc.)), etc.

As illustrated, embodiments of the present invention provide a method and apparatus for handling exceptions in a multi-processing environment wherein the processors can be of a same type and share a same memory while executing different operating systems. Moreover, embodiments of the present invention can provide this exception handling without requiring the processors to determine a processor identification through external queries to external devices, such as a memory controller, thereby making the handling of the exceptions faster. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A network element for routing traffic between networks, comprising:

a first line card coupled to a first network;

a second line card coupled to a second network different than the first network;

a control card coupled to the first line card and the second line card for routing network traffic between the first and second networks via the first line card and the second line card, the control card including a plurality of processors including a first processor and a second processor, a memory including a common exception handling vector address space shared by the plurality of processors, and a plurality of exception handling vector address spaces each associated with each of the plurality of processors, including a first exception and a second exception handling vector address spaces associated with the first and second processors respectively, a memory controller coupled to the memory and the plurality of processors, wherein the first processor is to execute a first operating system, wherein the first operating system is a real-time operating system to handle routing network traffic, and wherein the second processor is to execute a second operating system and to execute one or more instructions in the common exception handling vector address space upon receipt of an exception, wherein the second operating system is a non-real-time operating system to handle at least one of provisioning and configuration of the network element wherein the one or more instructions cause the second processor to modify based on an identification of the second processor an execution flow of the exception to execute an interrupt handler located within a respective dedicated interrupt handling vector address spaces associated with the second processor.

2. The network element of claim 1, wherein the first network is a network provider network and the second network is a service provider network.

3. A system comprising:

a plurality of processors to execute different operating systems and to each handle exceptions, wherein at least one of the different operating systems is a real-time operating system to handle routing network traffic and at least one other one of the different operating systems is a non-real-time operating system to handle at least one of provisioning and configuration of a network element;

a memory device to store a common exception handling vector address space, the address space having a separate interrupt handler for each operating system; and a memory controller coupled to the memory and plurality of processors, wherein upon receiving an exception at one of the plurality of processors, the processor determines a type of the exception and executes instructions within the common exception handling vector address space to determine an identification of the processor based on a value in an internal register and to select an interrupt handler for the operating system of the identified processor.

4. The system of claim 3, wherein the internal register is not dedicated to determining the identification of the one of the plurality of the processors.

5. The system of claim 3, wherein the one of the plurality of processors is to determine the identification of the one of the plurality of the processors during initialization, based on communications with the memory controller.

6. A system to handle exceptions comprising:
a plurality of processors;
a plurality of dissimilar operating systems, wherein each of the plurality of processors executes one of the plurality of dissimilar operating systems, wherein at least some of the plurality of dissimilar operating systems are real-time operating systems to handle routing network traffic and at least some of the plurality of dissimilar operating systems are non-real-time operating systems to handle at least one of provisioning and configuration of a network element;
a memory, wherein the memory is to store a common exception handling vector address space and a plurality of separate interrupt handlers for each of the plurality of dissimilar operating systems; and
a memory controller coupled to the memory and the plurality of processors, wherein upon receiving an exception by one of the plurality of processors, the one of the plurality of processors determines a type of the exception, executes instructions within the common exception handling vector address space, determines an identification of the one of the plurality of processors based on a value stored in an internal register of the one of the plurality of processors, and selects one of a plurality of separate interrupt handlers for the operating system of the identified processor.

7. The system of claim 6, wherein each of the plurality of operating systems is associated with one of the interrupt handling vector address spaces.

8. The system of claim 6, wherein the internal register is not dedicated to determining the identification of the one of the plurality of the processors.

9. The system of claim 6, wherein the one of the plurality of the processors is to determine the identification of the one of the plurality of the processors during initialization, based on communications with the memory controller.

10. A machine storage-readable medium that provides instructions to handle exceptions in a system having a plurality of processors, a plurality of dissimilar operating systems, a memory, and a memory controller coupled to the memory and the plurality of processors, the instructions when executed by a machine, causes the machine to perform operations comprising:
receiving an exception within one of the plurality of processors, wherein each of the plurality of processors execute one of the plurality of dissimilar operating systems, the memory is used to store a common exception handling vector address space and a plurality of separate interrupt handlers for each of the plurality of dissimilar operating systems, the one of the plurality of processors having an internal register, wherein at least some of the plurality of dissimilar operating systems are real-time operating systems to handle routing network traffic and at least some of the plurality of dissimilar operating systems are non-real-time operating systems to handle at least one of provisioning and configuration of a network element;
determining a type of the execution by the one of the plurality of processors;
executing instructions within the common exception handling vector address space by the one of the plurality of processors;
determining, by the one of the plurality of processors, an identification of the one of the plurality of processors based on a value stored in the internal register; and
selecting one of a plurality of separate interrupt handlers for the operating system of the identified processor by the one of the plurality of processors.

11. The machine storage-readable medium of claim 10, wherein the internal register is not dedicated to determining the identification of the one of the plurality of processors.

12. The machine storage-readable medium of claim 10, wherein each of the operating systems is associated with one of the interrupt handling address spaces.

13. The machine storage-readable medium of claim 10, further comprising determining the identification of the one of the plurality of processors during initialization of the one of the plurality of processors, based communications with the memory controller.

* * * * *

UNITED STATES PATENT AND TRADEMARK OFFICE
CERTIFICATE OF CORRECTION

| | | |
|---|---|---|
| PATENT NO. | : 7,519,975 B2 | Page 1 of 1 |
| APPLICATION NO. | : 11/492335 | |
| DATED | : April 14, 2009 | |
| INVENTOR(S) | : Lal | |

It is certified that error appears in the above-identified patent and that said Letters Patent is hereby corrected as shown below:

In Column 7, Line 42, delete "media," and insert -- media --, therefor.

In Column 7, Line 64, in Claim 1, delete "compnsing:" and insert -- comprising: --, therefor.

In Column 8, Lines 29-30, in Claim 1, delete "element wherein" and insert -- element, wherein --, therefor.

Signed and Sealed this
Twelfth Day of February, 2013

Teresa Stanek Rea
*Acting Director of the United States Patent and Trademark Office*